United States Patent [19]

Neumann et al.

[11] 3,748,001
[45] July 24, 1973

[54] RESILIENTLY BIASED CONSTANT CONTACT SIDE BEARING

[75] Inventors: Otto Walter Neumann; Louis Dean Davis, both of Chicago, Ill.

[73] Assignee: Amsted Industries Incorporated, Chicago, Ill.

[22] Filed: Nov. 17, 1971

[21] Appl. No.: 199,620

[52] U.S. Cl............................ 308/138, 105/199 CB
[51] Int. Cl......... B61f 5/14, B61f 5/50, F16c 17/04
[58] Field of Search...................... 105/199 CB, 200; 308/138

[56] References Cited
UNITED STATES PATENTS

| 577,007 | 2/1897 | Cliff................................... 308/138 |
| 2,515,853 | 7/1950 | Blattner............................. 308/138 |
| 2,285,140 | 6/1942 | Barrow et al....................... 308/138 |

FOREIGN PATENTS OR APPLICATIONS 574,817   1/1946   Great Britain...................... 105/200

Primary Examiner—Robert C. Sheridan
Assistant Examiner—Howard Beltran
Attorney—Walter L. Schlegel, Jr.

[57] ABSTRACT

A side bearing for a railroad car and truck acting between the car truck bolster and the car body bolster to resist nosing and swiveling of the truck and to control rocking of the car body. Each side bearing comprises a tubular base unit rigidly attached to the truck bolster, a vertical spring mounted inside the base unit and engaging the lower interior portion of a cup-shaped cap, the upper surface of the cap being frictional engagement with a wear plate attached to the lower surface of the car body bolster.

4 Claims, 4 Drawing Figures

Patented July 24, 1973

Inventors:
Otto W. Neumann
Louis D. Davis
By Walter F. Schlegel, Jr.
Attys.

Patented July 24, 1973 3,748,001

Inventors
Otto W. Neumann
Louis D. Davis

RESILIENTLY BIASED CONSTANT CONTACT SIDE BEARING

The invention relates to railway car trucks and more particularly to side bearings adapted to be mounted on a bolster and thus tending to maintain the car in an upright position and yieldably resist the rocking of the car with respect to the truck bolster.

Another object is to provide effective frictional resistance to minimize swivel and nosing of the car truck encountered primarily at high speeds.

An additional object of the invention is to provide a side bearing having a base unit, one end rigidly attached to the truck bolster, and a cap movably associated with the other end of the base unit and a resilient means within said base unit to resist a downward vertical movement of the cap with respect to the base unit, the resilient means and the cap being so constructed and arranged that the cap is retained out of contact with the base unit during any normal vertical movement.

A further feature of the invention is the provision of an annular surface in the cap to protect the resilient means from damage when the railroad car encounters severe and unusual conditions of the rails or track bed that cause the car body to rock with great amplitude. Heretofore such rocking caused excessive force to be transmitted to the side bearing of such magnitude that the resilient means became fully compressed and ultimately resulted in their damage. However, this result is thwarted herein because the annular surface is so placed in the cap that it will contact the top of the base unit before the resilient means can reach its fully compressed condition.

An additional aspect of the invention is that a close spacing is maintained between the interior walls of the cap and the exterior walls of the base unit on the sides of the side bearing which are parallel to the longitudinal axis of the bolster in order to restrict nosing and swivel of the truck. However, greater spacing is maintained between the interior walls of the cap and the exterior walls of the base unit on the front and rear of the side bearing which are perpendicular to the longitudinal axis of the bolster to allow for the normal unrestricted movement of the cap and base that is associated with car rock.

A further object of the invention is the arrangement where the sides of the cap extend around the sides of the base unit even when the side bearing is unloaded and the resilient member is in its extended relaxed condition. Thus, it is no longer necessary to provide a retaining means such as a pin to hold the springs in the side bearing with an initial degree of compression as was done in the prior art devices. The prior art devices also required this initial degree of compression to prevent the resilient member from being compressed to solidarity. However, as previously indicated this is prevented by the arrangement where the annular surface of the cap contacts the upper portion of the base unit before the resilient member becomes fully compressed.

Another aspect of this invention resides in the provision wherein the interior walls of the base unit are tapered so that the cross section of the walls become less as it extends away from the point of attachment on the truck bolster. Such an arrangement will allow the resilient member such as a spring to move slightly off the perpendicular until the walls of the cap would contact the sides of the base unit. This occurs when the truck and car negotiate a curve in the track. After completion of the turn, the spring would exert a centering force on the cap so that proper alignment of the cap and base unit would be maintained with a resultant reduction in wear of the associated parts.

The invention embodies other novel features, details of construction and arrangement of parts which are hereinafter set forth in the specification and claims and illustrated in the accompanying drawings forming part thereof, wherein:

It should be understood that even though the invention is illustrated as a separate assembly having a bottom part or unit which can be bolted or riveted to the truck bolster, that part or unit of such an assembly may be cast as an integral part of the bolster.

Figure 1:
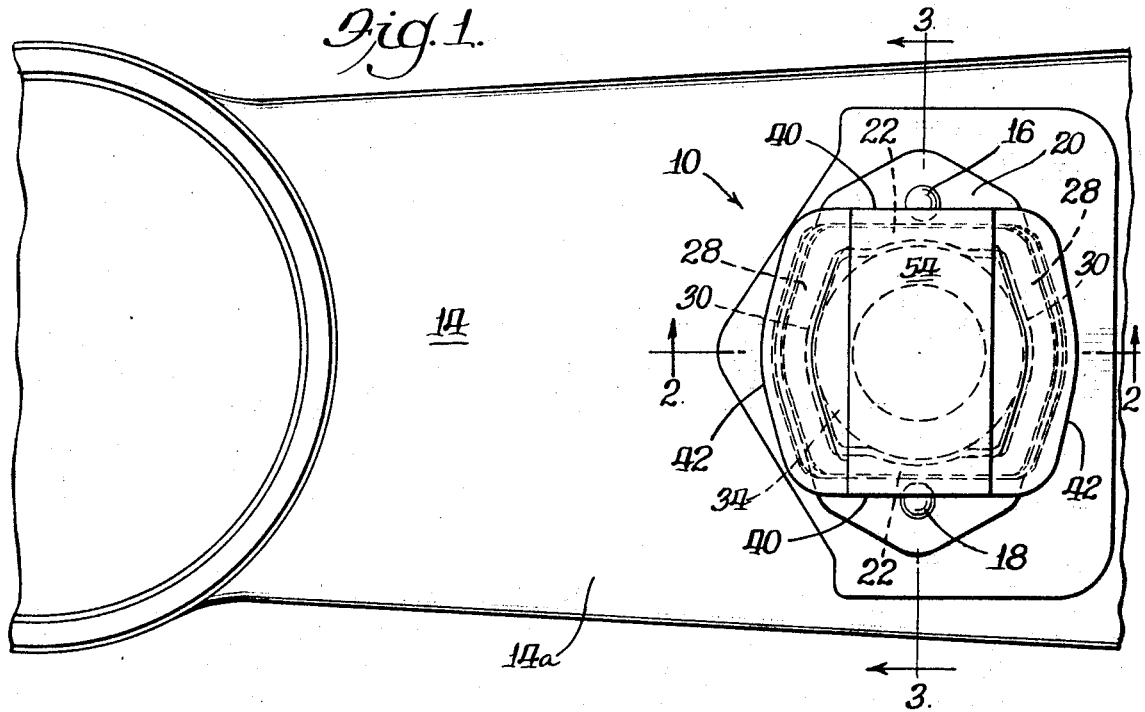
FIG. 1 is a detailed plan view showing the side bearing mounted on the truck bolster.
Figure 2:
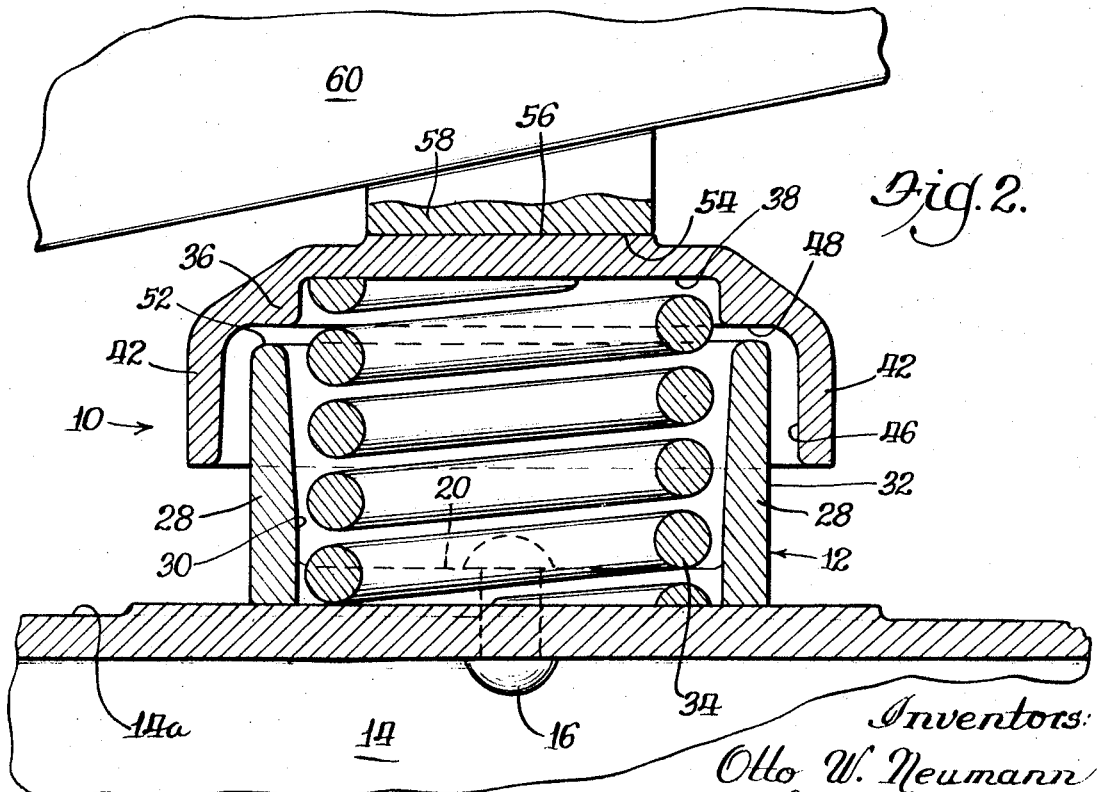
FIG. 2 is a transverse sectional view, partly in elevation taken on line 2—2 of FIG. 1.

Referring to the drawings for a better understanding of the invention and more particularly to the embodiment shown in FIGS. 1 and 2, the side bearing assembly is shown generally at 10 and has a major axis which is coincident with line 3—3 of FIG. 1. When the side bearing is mounted upon the bolster of a railway truck the major axis of the side bearing is perpendicular to the longitudinal axis of the bolster.

Figure 3:
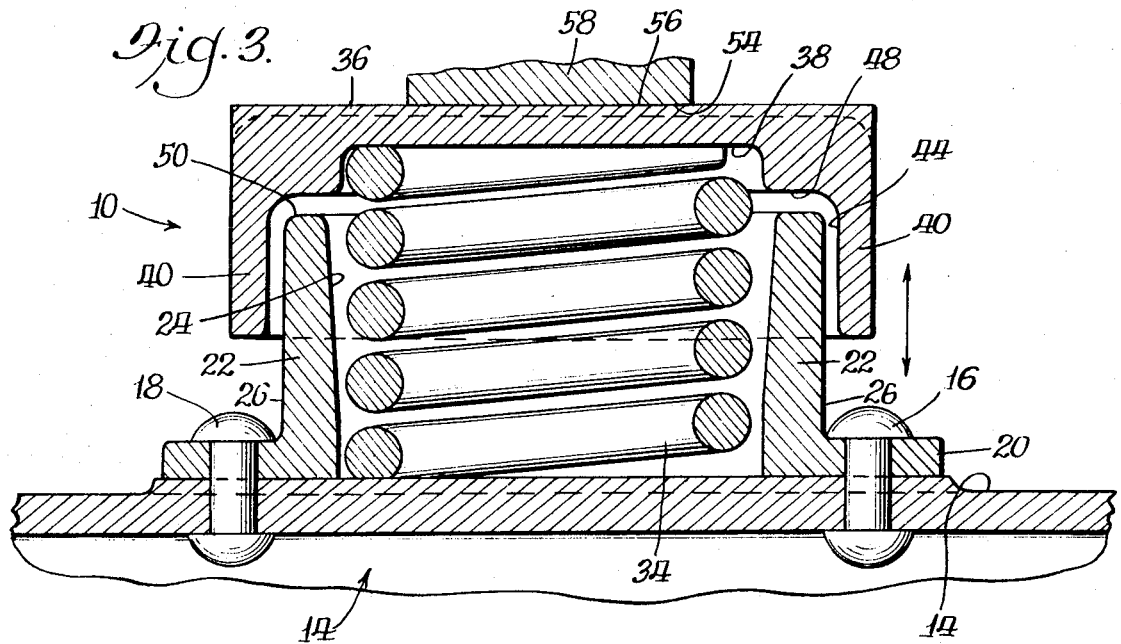
FIG. 3 is a sectional view of the side bearing shown in FIG. 1 taken on line 3—3 of FIG. 1 showing the spring approaching its fully compressed condition.

The side bearing comprises a tubular base unit 12 which is attached to the truck bolster 14 by means of rivets 16 which pass through holes 18 in the flanges 20 located on the sides of the base unit 12. The side walls 22 of the base unit, as best seen in FIG. 3, are perpendicular to the major axis of the side bearing 10 and have interior surfaces 24 which are tapered upwardly and outwardly away from the track bolster 14. The exterior surface 26 of the side walls 22 are substantially perpendicular to the top wall of the truck bolster 14.

Figure 4:
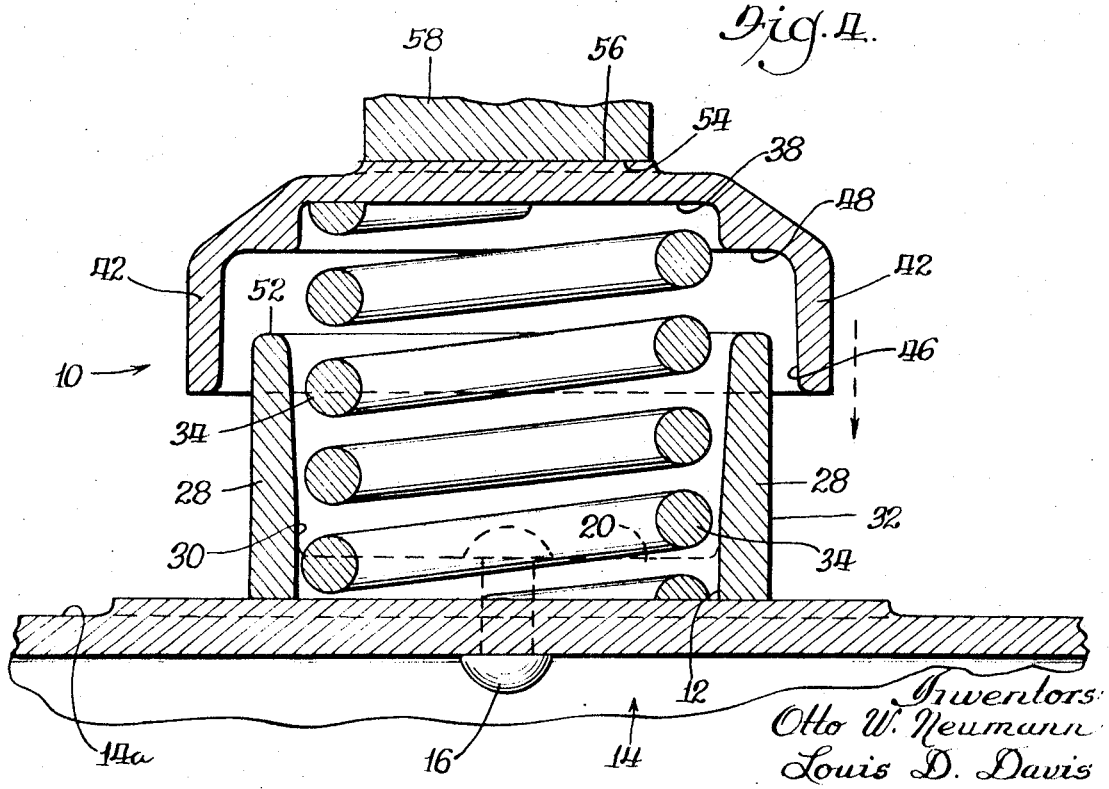
FIG. 4 is a transverse sectional view of the side bearing shown in FIG. 1 taken on line 2—2 of FIG. 1 showing the side bearing unloaded and the spring at its free height.

The front and rear walls 28, shown best in FIGS. 2 and 4, are substantially parallel with the major axis of the side bearing 10. The interior surfaces 30 are also tapered upwardly and outwardly away from the truck bolster 14 with the exterior surfaces 32 of the wall 28 being substantially perpendicular to the top wall 14a of the truck bolster 14.

The base unit 12 defines a pocket when closed at the bottom by the bolster 14. At least one spring 34 is mounted in the pocket defined by the base unit 12 and is subject to vertical resilient movement as hereinafter described. One end of the spring 34 is retained by the base unit 12 against the bolster 14. The other end of the spring 34 engages a cap 36 at its lower inside surface 38.

The lower portion of the cap 36 is cup-shaped and is defined by downwardly extending side walls 40 and downwardly extending front and rear walls 42 which surround the base unit 12 in a telescoping relationship. The side walls 40 of the cap 36 have interior surfaces 44 which are parallel to the respective exterior surfaces 26 of the side walls 22 of the base unit 12. Also, the front and rear walls 42 of the cap 36 have interior surfaces 46 which are parallel to the respective exterior surfaces 32 of the front and rear walls 28 of the base unit 12. The downwardly extending walls 40 and 42 of the cap 36 overlap the base unit 12 in such a fashion that even when the spring 34 is at its free height or uncompressed condition there is still present a substantial amount of overlap between the interior surfaces 44 and 46 of the cap 36 and the respective exterior surfaces 26 and 32 of the base unit 12. The fact that this condition of overlap is always present eliminates the need for a retaining pin which had previously been required to prevent separation and misalignment of the cap with respect to the base unit in the event the side bearing became unloaded.

When the side bearing 10 is mounted on the truck bolster 14 the major axis of the side bearing is coincident with line 3—3 of FIG. 1 and is parallel to the longitudinal axis of the railroad car.

In order to provide for unrestricted movement between the cap 36 of the base unit 12, such movement being associated with car rock, it is necessary that the interior front and rear surfaces 46 of the cap 36 and the respective exterior front and rear surfaces 32 of the base unit 12 be substantially spaced apart.

However, since it is also necessary to restrict nosing and swiveling of the car truck, the spacing is much less substantial between the interior side surfaces 44 of the cap 36 and the respective exterior side surfaces 26 of the base unit 12.

Inside the cup-shaped opening of the cap 36, which is formed by the downwardly depending walls 40 and 42, is an annular surface 48 which contacts the upper surface 50 and 52 of the respective walls 22 and 28 of the base unit 12. The aforementioned contact is made slightly before the spring 34 becomes solid. Thus, the annular surface 48 inside the cap 36 acts as a positive stop and will protect the spring 34 from any damage that may occur in the event it were allowed to go solid.

The upper surface 54 of the cap 36 frictionally engages the lower surface 56 of the wear plate 58 which is rigidly connected to the car body bolster 60. Thus, the frictional engagement of the cap 36 and the car body bolster 60 allow the car body and car truck to rotate with respect to one another about a vertical axis which is concentric with the interengaged center plates (not shown) of the truck bolster 14 and the car body bolster 60. Side bearings are positioned at respective ends of the respectively truck bolster 14 and are in frictional engagement with opposing wear plates 58 on the car body bolster 60 so that during any motion of the car body there is frictional pressure applied to the car body adjacent both ends of the truck bolster 14. Thus, the frictional engagement provides substantial control in the reduction of nosing and swiveling of the car truck while allowing the truck enough freedom to follow the track around a curve. While the truck is rotating with respect to the car about the vertical axis which passes through the center plates, the cap 36 on the side bearing 10 and the frictional wear plate 58 on the car body bolster 60 tend to move generally longitudinally while still allowing up-and-down movement of the cap 36 when required due to rocking of the car body. Throughout the turning operation the depending walls 40 and 42 of the cap 36 maintain a proper centering of the cap 36 with respect to the base unit 12 will allow the spring 34 to operate substantially in the vertical direction.

After completion of the turn, one of the interior surfaces 44 of the cap 36 will be in contact with one of the respective exterior surfaces 26 of the base unit 12. The particular surfaces which contact, of course, will depend upon the direction of the turn and also the particular location of the side bearing. However, if such contact were allowed to continue after completion of the turn the result would be excessive and premature wear of the parts in the assembly. Therefore, to prevent such undesirable contact the interior surfaces 24 and 30 of the side walls 22 and front and rear walls 28 of the base unit 12 are tapered to allow the spring 34 to move slightly off the perpendicular during any required turning. However, upon completion of said turn the spring 34 will exert a centering force on the cap 36 and thus terminate any residual contact between the cap 36 of the base unit 12 until another turn is encountered.

The interior surfaces 30 of the front and rear walls 28 of the base unit 12 have a Vee-contour as best shown in FIG. 1 to help maintain vertical orientation of the spring 34 during up-and-down motion of the cap 36 associated with car rock. The exterior surfaces 32 of the front and rear walls 28 of the base unit are parallel with the respective interior surfaces 30 of the front and rear wall 28 and are received in a spaced relationship by the Vee-contour of the interior surfaces 46 of the downwardly depending front and rear walls 42 of the cap 36. Thus, proper orientation of the cap 36 is maintained with respect to the base unit 12 to restrict nosing and swiveling of the car truck. When used in combination with another side bearing mounted on the opposite end of the truck bolster the lateral surfaces of one side bearing contacts on one unit and the opposite lateral surfaces contacts on the other unit.

It should be understood that the arrangement described above constitutes the preferred embodiment and that many adaptations and modifications may be made without departing from the spirit of the invention. We are aware that the invention may be inverted and adapted to the car body bolster while being in frictional engagement with the truck bolster.

We claim:

1. For use with a railway car truck having a truck bolster and a car body bolster supported thereby, a side bearing comprising a tubular base unit supported by said truck bolster, a resilient member supported at one end by said truck bolster and extending through said tubular base unit, a cap between said tubular base unit and said body bolster in frictional engagement with said body bolster, said cap being spaced from and centered relative to said tubular base unit and having tubular walls defining a cup-shaped opening, said walls extending around said tubular base unit, the other end of said resilient member contacting said cap and being centered and partially located within said cup-shaped opening, the inner surfaces of said tubular base unit being concentric about its longitudinal axis and diverging outwardly away from said truck bolster, whereby said base unit closely confines said resilient member adjacent said truck bolster and loosely confines said resilient member adjacent said cap.

2. A side bearing according to claim 1 wherein said walls extend around said tubular base unit when said resilient member is in its extended uncompressed condition.

3. A side bearing for a railway car truck bolster comprising a tubular base unit having side walls and front and rear walls, said base unit being supported by said truck bolster, a spring having its lower end seated on said truck bolster and extending through said tubular base unit, a cap seated on the upper end of said spring and having downwardly depending walls extending around said tubular base unit, a surface on top of said cap for frictional engagement with an overlying car body surface to resist downward and horizontal movement thereof, said front and rear walls having an intermediate angular relationship forming a Vee-contour which corresponds to a complementary Vee-contour of said downwardly depending cap walls whereby said tubular base unit is received in a spaced telescoping relationship within said cap.

4. A side bearing according to claim 3 wherein the spacing between said side walls and said downwardly depending cap walls is relatively small and the spacing between said front and rear walls of said tubular base unit and said downwardly depending cap walls is relatively large.

* * * * *